US010901914B2

(12) United States Patent
Li et al.

(10) Patent No.: US 10,901,914 B2
(45) Date of Patent: Jan. 26, 2021

(54) METHOD FOR WRITING MULTIPLE COPIES INTO STORAGE DEVICE, AND STORAGE DEVICE (71) Applicant: Huawei Technologies Co., Ltd., Shenzhen (CN)

(72) Inventors: Xiaohua Li, Chengdu (CN); Ji Ouyang, Chengdu (CN); Qi Wang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/676,043

(22) Filed: Aug. 14, 2017

(65) Prior Publication Data
US 2017/0371804 A1    Dec. 28, 2017

Related U.S. Application Data (63) Continuation of application No. PCT/CN2016/072316, filed on Jan. 27, 2016.

(30) Foreign Application Priority Data

Feb. 12, 2015   (CN) .......................... 2015 1 0075562

(51) Int. Cl.
*G06F 12/08*    (2016.01)
*G06F 3/06*    (2006.01)
*G06F 12/109*    (2016.01)

(52) U.S. Cl.
CPC ............ *G06F 12/109* (2013.01); *G06F 3/065* (2013.01); *G06F 3/0611* (2013.01);
(Continued)

(58) Field of Classification Search
None
See application file for complete search history.

(56) References Cited

U.S. PATENT DOCUMENTS 5,454,092 A * 9/1995 Sibigtroth ........... G06F 12/0653
710/3
6,073,218 A  6/2000 DeKoning et al.
(Continued)

FOREIGN PATENT DOCUMENTS

CN        101719103 A    6/2010
CN        103064795 A    4/2013
(Continued)

OTHER PUBLICATIONS

Foreign Communication From a Counterpart Application, European Application No. 16748608.3, Extended European Search Report dated Jan. 4, 2018, 21 pages.
(Continued)

*Primary Examiner* — Sean D Rossiter
*Assistant Examiner* — Stephanie Wu
(74) *Attorney, Agent, or Firm* — Conley Rose, P.C.

(57) ABSTRACT

A method for writing multiple copies into a storage device includes receiving a first write data request that includes an identity (ID) of a first logical storage unit, target data, and a logical block address (LBA) of the first logical storage unit, determining that data stored in storage space corresponding to the LBA of the first logical storage unit is not accessed by another data access request, writing the target data into the storage space corresponding to the LBA of the first logical storage unit, generating a second write data request that includes an ID of a second logical storage unit, the target data, and an LBA of the second logical storage unit, and writing the target data into storage space corresponding to the LBA of the second logical storage unit.

20 Claims, 3 Drawing Sheets

(52) U.S. Cl.
CPC .......... *G06F 3/0617* (2013.01); *G06F 3/0619* (2013.01); *G06F 3/0689* (2013.01); *G06F 12/08* (2013.01); *G06F 2212/1024* (2013.01); *G06F 2212/657* (2013.01)

(56) References Cited

U.S. PATENT DOCUMENTS

| | | | | |
|---|---|---|---|---|
| 6,151,659 | A * | 11/2000 | Solomon | G06F 3/0622 710/200 |
| 6,728,905 | B1 * | 4/2004 | Gnanasivam | G06F 3/0617 714/43 |
| 7,584,340 | B1 * | 9/2009 | Colgrove | G06F 3/0608 360/48 |
| 7,730,258 | B1 * | 6/2010 | Smith | G06F 3/0622 711/114 |
| 9,304,951 | B1 * | 4/2016 | Chatterjee | G06F 12/00 |
| 9,933,947 | B1 * | 4/2018 | Vokaliga | G06F 3/061 |
| 2003/0050729 | A1 * | 3/2003 | Basham | G06F 3/0686 700/214 |
| 2009/0240860 | A1 * | 9/2009 | Coon | G06F 9/526 710/200 |
| 2013/0031069 | A1 * | 1/2013 | Dudgeon | G06F 16/2365 707/704 |
| 2014/0189236 | A1 | 7/2014 | Li | |
| 2014/0289485 | A1 * | 9/2014 | Inai | G06F 3/065 711/162 |
| 2014/0324774 | A1 * | 10/2014 | Chen | G06F 17/30215 707/611 |
| 2015/0012704 | A1 * | 1/2015 | Watanabe | G06F 3/0689 711/114 |
| 2015/0106802 | A1 * | 4/2015 | Ivanov | G06F 9/45558 718/1 |

FOREIGN PATENT DOCUMENTS

| | | |
|---|---|---|
| CN | 103250143 A | 8/2013 |
| CN | 103631682 A | 3/2014 |
| CN | 103827843 A | 5/2014 |

OTHER PUBLICATIONS

Machine Translation and Abstract of Chinese Publication No. CN101719103, Jun. 2, 2010, 18 pages.
Machine Translation and Abstract of Chinese Publication No. CN103064795, Apr. 24, 2013, 35 pages.
Machine Translation and Abstract of Chinese Publication No. CN103631682, Mar. 12, 2014, 19 pages.
Machine Translation and Abstract of Chinese Publication No. CN103827843, May 28, 2014, 22 pages.
Foreign Communication From a Counterpart Application, PCT Application No. PCT/CN2016/072316, English Translation of International Search Report dated May 4, 2016, 2 pages.
Foreign Communication From a Counterpart Application, PCT Application No. PCT/CN2016/072316, English Translation of Written Opinion dated May 4, 2016, 6 pages.
Wikipedia, "Conflict-free replicated data type," Jan. 8, 2015, 7 pages.
Foreign Communication From a Counterpart Application, European Application No. 16748608.3, European Office Action dated Oct. 5, 2018, 10 pages.

* cited by examiner

METHOD FOR WRITING MULTIPLE COPIES INTO STORAGE DEVICE, AND STORAGE DEVICE

CROSS-REFERENCE TO RELATED APPLICATIONS

This application is a continuation of International Patent Application No. PCT/CN2016/072316 filed on Jan. 27, 2016, which claims priority to Chinese Patent Application No. 201510075562.7 filed on Feb. 12, 2015, both of which are hereby incorporated by reference in their entireties.

TECHNICAL FIELD

Embodiments of the present application relate to computer technologies, and in particular, to a method for writing multiple copies into a storage device, and a storage device.

BACKGROUND

The development of information technology (IT) is accompanied with difficulty in prevention of a threat to data, for example, a data processing and access software platform fault, a design vulnerability of an operating system, a system hardware fault, or malicious damage from an unauthorized visitor in a network. To prevent a data loss, stored data needs to be copied to obtain multiple copies.

In other approaches, after receiving any write data request sent by a host, a storage device needs to first write to-be-stored data in the write data request into a main logical storage unit of the storage device to obtain intermediate data that corresponds to the to-be-stored data, and then write the intermediate data in the main logical storage unit into a target logical storage unit that corresponds to the write data request.

As service application grows in scale, an amount of stored data that needs to be copied increases. However, in the existing data write method, the to-be-stored data needs to be first written into the main logical storage unit, and then written into the target logical storage unit. As a result, a delay of writing all the to-be-stored data into the storage device is relatively large, and an access response capability of a system is relatively poor.

SUMMARY

Embodiments of the present application provide a method for writing multiple copies into a storage device, and a storage device, thereby improving an overall access response capability of a system.

According to a first aspect, an embodiment of the present application provides a method for writing multiple copies into a storage device, where the storage device includes a controller and at least two logical storage units, and the method is executed by the controller and includes receiving a first write data request sent by a host, where the first write data request includes an identity (ID) of a to-be-accessed first logical storage unit, target data, and a logical block address (LBA) of the first logical storage unit, determining that data stored in storage space corresponding to the LBA of the first logical storage unit is not accessed by another data access request that has a resource conflict with the first write data request, where the data access request that has a resource conflict with the first write data request refers to a data access request that cannot access storage space corresponding to a same LBA of a same logical storage unit simultaneously with the first write data request, writing the target data into the storage space corresponding to the LBA of the first logical storage unit, generating a second write data request, where the second write data request includes an ID of a second logical storage unit, the target data, and an LBA of the second logical storage unit, and writing the target data into storage space corresponding to the LBA of the second logical storage unit.

With reference to the first aspect, in a first possible implementation manner of the first aspect, writing the target data into storage space corresponding to the LBA of the second logical storage unit includes determining whether data stored in the storage space corresponding to the LBA of the second logical storage unit is accessed by another data access request that has a resource conflict with the second write data request, where the data access request that has a resource conflict with the second write data request refers to a data access request that cannot access storage space corresponding to a same LBA of a same logical storage unit simultaneously with the second write data request, writing the target data into the storage space corresponding to the LBA of the second logical storage unit if the data stored in the storage space corresponding to the LBA of the second logical storage unit is not accessed by another data access request that has a resource conflict with the second write data request, or comparing whether a priority of the first logical storage unit is higher than a priority of the second logical storage unit if the data stored in the storage space corresponding to the LBA of the second logical storage unit is accessed by another data access request that has a resource conflict with the second write data request, temporarily skipping the step of writing the target data into the storage space corresponding to the LBA of the second logical storage unit if the priority of the first logical storage unit is higher than the priority of the second logical storage unit, and writing the target data into the storage space corresponding to the LBA of the second logical storage unit when the other data access request that has a resource conflict with the second write data request completes access of the data stored in the storage space corresponding to the LBA of the second logical storage unit.

With reference to the first possible implementation manner of the first aspect, in a second possible implementation manner of the first aspect, the method further includes generating a third write data request if the priority of the first logical storage unit is not higher than the priority of the second logical storage unit, where the third write data request includes an ID of a third logical storage unit, the target data, and an LBA of the third logical storage unit, and a priority of the third logical storage unit is higher than the priority of the first logical storage unit, and writing the target data into storage space corresponding to the LBA of the third logical storage unit.

With reference to any one of the first aspect, or the first or the second possible implementation manner of the first aspect, in a third possible implementation manner of the first aspect, the method further includes receiving a first read data request sent by the host, where the first read data request includes an ID of a to-be-accessed logical storage unit and an LBA of the to-be-accessed logical storage unit, and the to-be-accessed logical storage unit includes the first logical storage unit or the second logical storage unit, determining whether the target data stored in storage space corresponding to the LBA of the to-be-accessed logical storage unit is accessed by another data access request that has a resource conflict with the first read data request, where the data access request that has a resource conflict with the first read data request refers to a data access request that cannot access storage space corresponding to a same LBA of a same logical storage unit simultaneously with the first read data request, and reading the target data stored in the storage space corresponding to the LBA of the to-be-accessed logical storage unit if the target data stored in the storage space corresponding to the LBA of the to-be-accessed logical storage unit is not accessed by another data access request that has a resource conflict with the first read data request, or temporarily skipping the step of reading the target data stored in the storage space corresponding to the LBA of the to-be-accessed logical storage unit if the target data stored in the storage space corresponding to the LBA of the to-be-accessed logical storage unit is accessed by another data access request that has a resource conflict with the first read data request, and reading the target data stored in the storage space corresponding to the LBA of the to-be-accessed logical storage unit when the other data access request that has a resource conflict with the first read data request completes access of the target data stored in the storage space corresponding to the LBA of the to-be-accessed logical storage unit.

According to a second aspect, an embodiment of the present application provides a storage device, where the storage device includes a controller and at least two logical storage units, the logical storage units are configured to store data, and the controller is configured to receive a first write data request sent by a host, where the first write data request includes an ID of a to-be-accessed first logical storage unit, target data, and an LBA of the first logical storage unit, determine that data stored in storage space corresponding to the LBA of the first logical storage unit is not accessed by another data access request that has a resource conflict with the first write data request, where the data access request that has a resource conflict with the first write data request refers to a data access request that cannot access storage space corresponding to a same LBA of a same logical storage unit simultaneously with the first write data request, write the target data into the storage space corresponding to the LBA of the first logical storage unit, generate a second write data request, where the second write data request includes an ID of a second logical storage unit, the target data, and an LBA of the second logical storage unit, and write the target data into storage space corresponding to the LBA of the second logical storage unit.

With reference to the second aspect, in a first possible implementation manner of the second aspect, the controller is further configured to determine whether data stored in the storage space corresponding to the LBA of the second logical storage unit is accessed by another data access request that has a resource conflict with the second write data request, where the data access request that has a resource conflict with the second write data request refers to a data access request that cannot access storage space corresponding to a same LBA of a same logical storage unit simultaneously with the second write data request, and write the target data into the storage space corresponding to the LBA of the second logical storage unit if the data stored in the storage space corresponding to the LBA of the second logical storage unit is not accessed by another data access request that has a resource conflict with the second write data request, or compare whether a priority of the first logical storage unit is higher than a priority of the second logical storage unit if the data stored in the storage space corresponding to the LBA of the second logical storage unit is accessed by another data access request that has a resource conflict with the second write data request, temporarily skip the step of writing the target data into the storage space corresponding to the LBA of the second logical storage unit if the priority of the first logical storage unit is higher than the priority of the second logical storage unit, and write the target data into the storage space corresponding to the LBA of the second logical storage unit when the other data access request that has a resource conflict with the second write data request completes access of the data stored in the storage space corresponding to the LBA of the second logical storage unit.

With reference to the first possible implementation manner of the second aspect, in a second possible implementation manner of the second aspect, the controller is further configured to generate a third write data request if the priority of the first logical storage unit is not higher than the priority of the second logical storage unit, where the third write data request includes an ID of a third logical storage unit, the target data, and an LBA of the third logical storage unit, and a priority of the third logical storage unit is higher than the priority of the first logical storage unit, and write the target data into storage space corresponding to the LBA of the third logical storage unit.

With reference to any one of the second aspect, or the first or the second possible implementation manner of the second aspect, in a third possible implementation manner of the second aspect, the controller is further configured to receive a first read data request sent by the host, where the first read data request includes an ID of a to-be-accessed logical storage unit and an LBA of the to-be-accessed logical storage unit, and the to-be-accessed logical storage unit includes the first logical storage unit or the second logical storage unit, determine whether the target data stored in storage space corresponding to the LBA of the to-be-accessed logical storage unit is accessed by another data access request that has a resource conflict with the first read data request, where the data access request that has a resource conflict with the first read data request refers to a data access request that cannot access storage space corresponding to a same LBA of a same logical storage unit simultaneously with the first read data request, and read the target data stored in the storage space corresponding to the LBA of the to-be-accessed logical storage unit if the target data stored in the storage space corresponding to the LBA of the to-be-accessed logical storage unit is not accessed by another data access request that has a resource conflict with the first read data request, or temporarily skip the step of reading the target data stored in the storage space corresponding to the LBA of the to-be-accessed logical storage unit if the target data stored in the storage space corresponding to the LBA of the to-be-accessed logical storage unit is accessed by another data access request that has a resource conflict with the first read data request, and read the target data stored in the storage space corresponding to the LBA of the to-be-accessed logical storage unit when the other data access request that has a resource conflict with the first read data request completes access of the target data stored in the storage space corresponding to the LBA of the to-be-accessed logical storage unit.

In the present application, a first write data request sent by a host is received, where the first write data request includes an ID of a to-be-accessed first logical storage unit, target data, and an LBA of the first logical storage unit. Further, it is determined that data stored in storage space corresponding to the LBA of the first logical storage unit is not accessed by another data access request that has a resource conflict with the first write data request, where the data access request that has a resource conflict with the first write data request refers to a data access request that cannot access storage space corresponding to a same LBA of a same logical storage unit simultaneously with the first write data request. Further, the target data is written into the storage space corresponding to the LBA of the first logical storage unit, a second write data request is generated, where the second write data request includes an ID of a second logical storage unit, the target data, and an LBA of the second logical storage unit, and the target data is written into storage space corresponding to the LBA of the second logical storage unit. It can be learned that the target data can be quickly written into different logical storage units of the storage device, thereby reducing a system delay and improving an overall access response capability of a system.

BRIEF DESCRIPTION OF DRAWINGS

To describe the technical solutions in the embodiments of the present application more clearly, the following briefly describes the accompanying drawings required for describing the embodiments.

DESCRIPTION OF EMBODIMENTS

To make the objectives, technical solutions, and advantages of the embodiments of the present application clearer, the following clearly and describes the technical solutions in the embodiments of the present application with reference to the accompanying drawings in the embodiments of the present application.

Figure 1A:
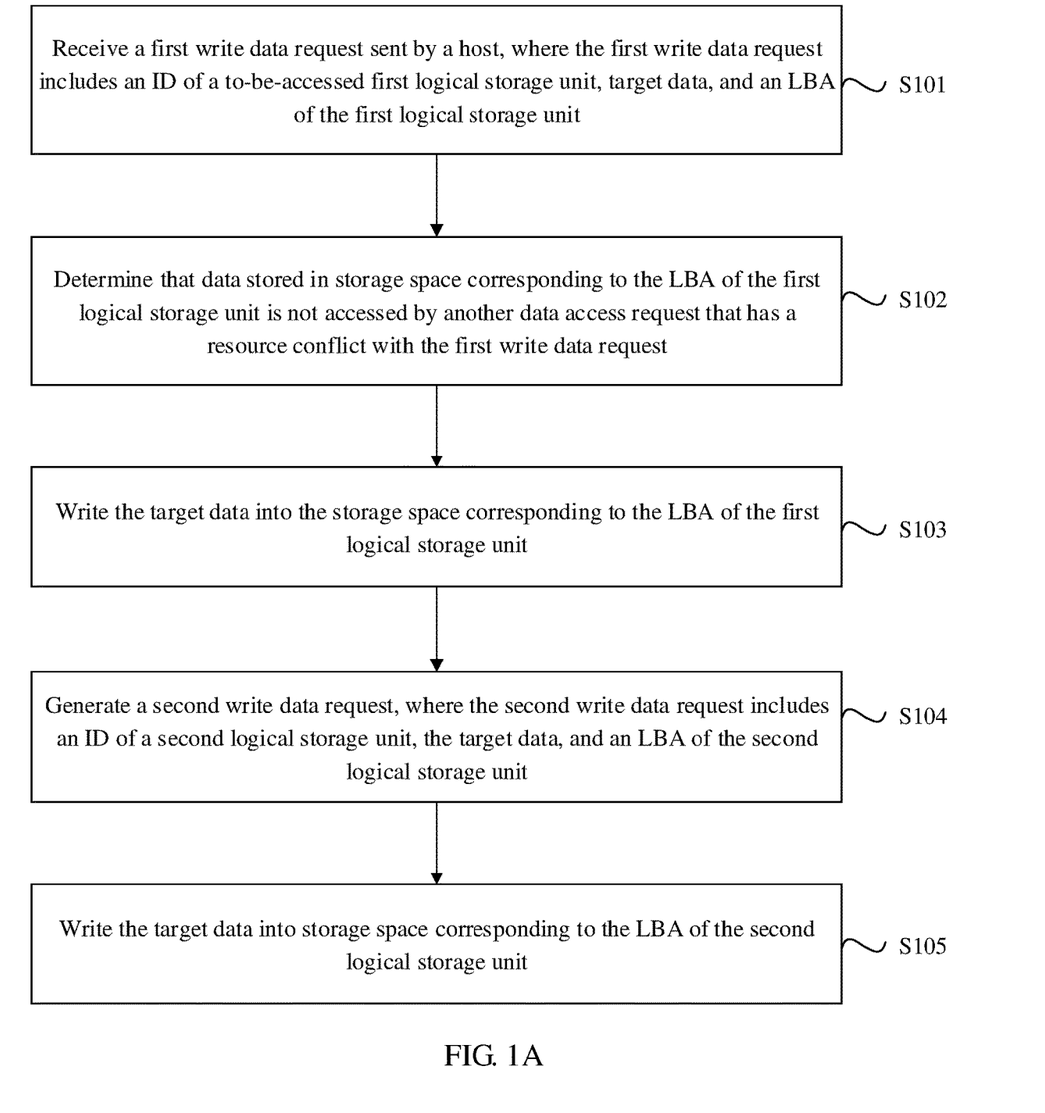
FIG. 1A is a schematic flowchart of Embodiment 1 of a method for writing multiple copies into a storage device according to the present application.
Figure 1B:
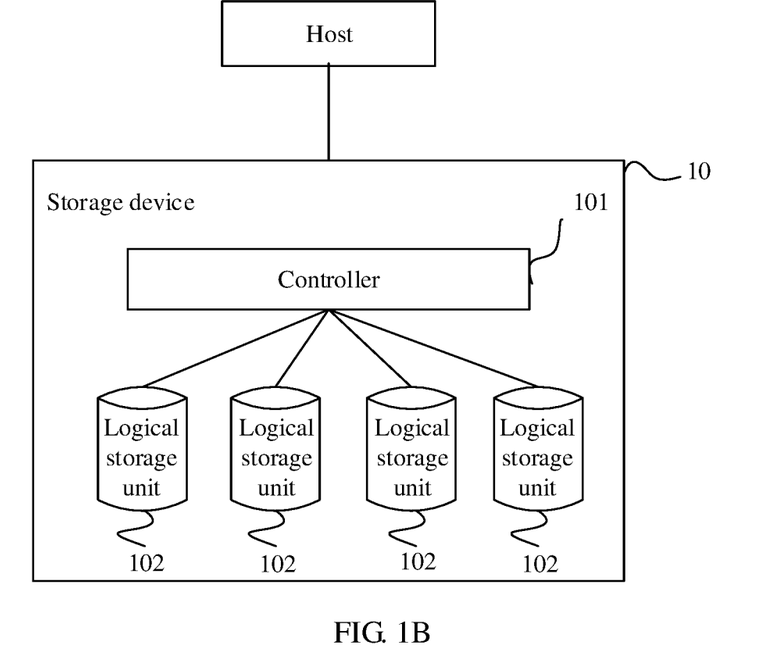
FIG. 1B is a schematic composition diagram of a storage system according to an embodiment of the present application.

FIG. 1A is a schematic flowchart of Embodiment 1 of a method for writing multiple copies into a storage device according to the present application. The solution of this embodiment may be applied to a storage system shown in FIG. 1B. FIG. 1B is a schematic composition diagram of a storage system according to an embodiment of the present application. As shown in FIG. 1B, the storage system includes a host and a storage device 10. The storage device 10 includes a controller 101 and at least two logical storage units 102. The controller 101 may include any computing device known in other approaches, for example, a server or a desktop computer. The controller 101 is configured to execute various data access requests, for example, operations of writing multiple copies into the storage device 10 and reading the multiple copies from the storage device 10. The at least two logical storage units 102 included in the storage device 10 are configured to provide storage space for storing data. Optionally, the storage device 10 may be a storage array, a storage server, or the like. The logical storage units 102 are logical space mapped from physical space. Optionally, for the storage system, the logical storage units 102 may be logical unit numbers (LUN), volumes, or the like.

Figure 1C:
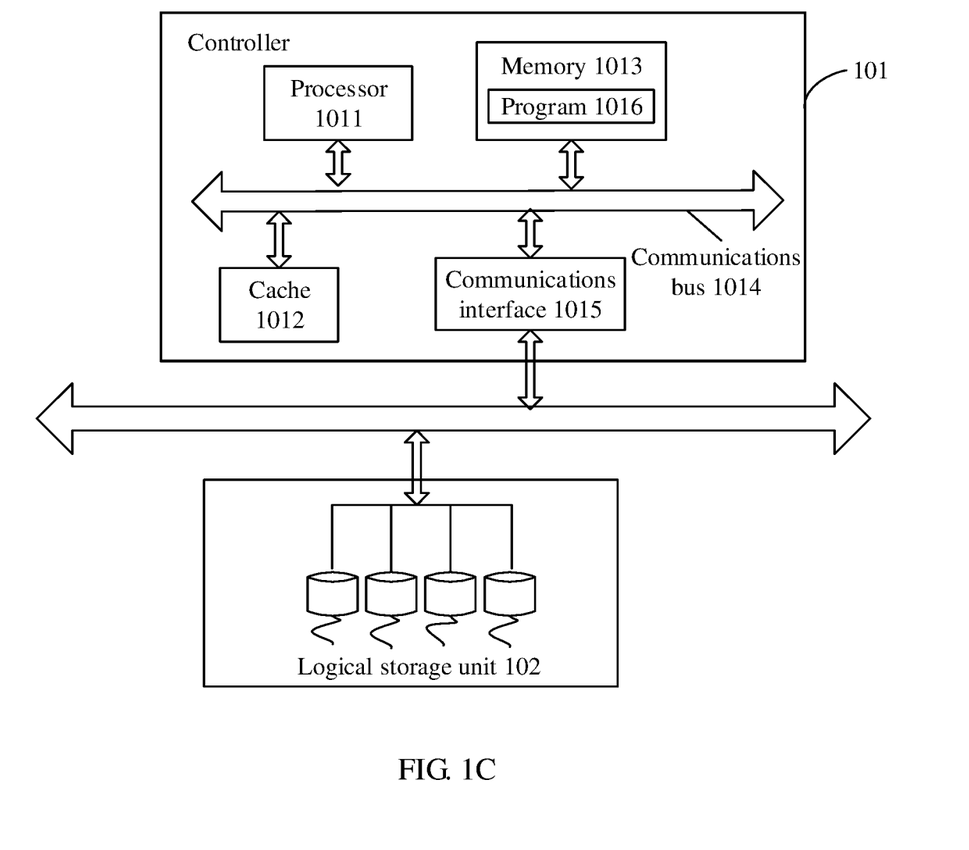
FIG. 1C is a schematic structural diagram of a controller according to an embodiment of the present application.

The following describes a hardware composition structure of the controller 101. Referring to FIG. 1C, FIG. 1C is a schematic structural diagram of the controller 101 according to an embodiment of the present application. As shown in FIG. 1C, the controller 101 mainly includes a processor 1011, a cache 1012, a memory 1013, a communications bus 1014, and a communications interface 1015. The processor 1011, the cache 1012, the memory 1013, and the communications interface 1015 communicate with each other using the communications bus 1014.

The communications interface 1015 is configured to communicate with the logical storage units 102.

The memory 1013 is configured to store a program 1016. The memory 1013 may include a high-speed random access memory (RAM), or may include a non-volatile memory, for example, at least one disk memory. It may be understood that the memory 1013 may be any non-transitory machine-readable medium that can store program code, such as a RAM, a magnetic disk, a hard disk, an optical disc, a solid state disk (SSD), or a non-volatile memory.

The program 1016 may include the program code.

The cache 1012 is configured to cache data received from the host or data read from the logical storage units 102. The cache 1012 may be any non-transitory machine-readable medium that can store data, such as a RAM, a read-only memory (ROM), a flash memory, or anSSD. This is not limited herein.

In addition, the memory 1013 and the cache 1012 may be integrally or separately disposed. This is not limited in this embodiment of the present application.

The processor 1011 may be a central processing unit (CPU), or an application-specific integrated circuit (ASIC), or one or more integrated circuits configured to implement this embodiment of the present application. In this embodiment of the present application, the processor 1011 may be configured to receive various data access requests from the host, and execute the various data access requests, for example, operations of writing multiple copies into the storage device and reading the multiple copies from the storage device.

The method in this embodiment may be applied to the storage system shown in FIG. 1B and the controller 101 shown in FIG. 1C. The processor 1011 of the controller 101 may perform each step shown in FIG. 1A.

Step S101: Receive a first write data request sent by a host, where the first write data request includes an ID of a to-be-accessed first logical storage unit, target data, and an LBA of the first logical storage unit.

In this embodiment of the present application, the controller of the storage device receives the first write data request sent by the host, where the first write data request includes the ID of the to-be-accessed first logical storage unit, the target data, and the LBA of the first logical storage unit. The target data is to-be-written data, and the ID of the first logical storage unit is used to indicate a destination logical storage unit of the storage device into which the host is to write the target data. Optionally, the first logical storage unit may be a LUN, a volume, or the like.

Step S102: Determine that data stored in storage space corresponding to the LBA of the first logical storage unit is not accessed by another data access request that has a resource conflict with the first write data request.

In this embodiment of the present application, when receiving the first write data request that includes the ID of the to-be-accessed first logical storage unit, the target data, and the LBA of the first logical storage unit and that is sent by the host, the controller further determines that the data stored in the storage space corresponding to the LBA of the first logical storage unit is not accessed currently by another data access request that has a resource conflict with the first write data request. The data access request that has a resource conflict with the first write data request refers to a data access request that cannot access storage space corresponding to a same LBA of a same logical storage unit simultaneously with the first write data request. That is, the controller determines that a data access operation that has a resource conflict with the first write data request is not being executed in the storage space corresponding to the LBA of the first logical storage unit. If the data stored in the storage space corresponding to the LBA of the first logical storage unit is definitely not accessed currently by any other data access request, or if the data stored in the storage space corresponding to the LBA of the first logical storage unit is being accessed currently by a data access request (that is, an ID, included in the data access request, of a to-be-accessed logical storage unit is also the ID of the first logical storage unit, and an LBA, included in the data access request, of the logical storage unit is also the LBA of the first logical storage unit), but mutex logic information included in the data access request is shared mutex logic (that is, the data access request can perform an access operation simultaneously with another data access request) (the shared mutex logic means that an event A and an event B may occur simultaneously within a specified range, but do not occur simultaneously beyond the specified range), the controller may perform, according to the first write data request, a write operation on the storage space corresponding to the LBA of the first logical storage unit.

Step S103: Write the target data into the storage space corresponding to the LBA of the first logical storage unit.

Step S104: Generate a second write data request, where the second write data request includes an ID of a second logical storage unit, the target data, and an LBA of the second logical storage unit.

Step S105: Write the target data into storage space corresponding to the LBA of the second logical storage unit.

In this embodiment of the present application, after determining that the data stored in the storage space corresponding to the LBA of the first logical storage unit is not accessed by another data access request that has a resource conflict with the first write data request, in step S103, the controller writes the target data into the storage space corresponding to the LBA of the first logical storage unit. In step S104, the controller generates the second write data request that includes the ID of the second logical storage unit, the target data, and the LBA of the second logical storage unit. The ID of the second logical storage unit is used to indicate a destination logical storage unit of the storage device into which the controller is to write the target data. Optionally, the second logical storage unit may be a LUN, a volume, or the like. Further, in step S105, the controller writes the target data into the storage space corresponding to the LBA of the second logical storage unit. Optionally, in this embodiment of the present application, a sequence of step S103, step S104, and step S105 is not limited. For example, step S103, step S104, and step S105 may be sequentially performed (that is, after writing the target data into the storage space corresponding to the LBA of the first logical storage unit, the controller generates the second write data request and writes the target data into the storage space corresponding to the LBA of the second logical storage unit). Alternatively, step S104 and step S105 are first performed and then step S103 is performed (that is, after generating the second write data request and writing the target data into the storage space corresponding to the LBA of the second logical storage unit, the controller writes the target data into the storage space corresponding to the LBA of the first logical storage unit). Alternatively, step S103, step S104, and step S105 are concurrently performed (that is, the controller concurrently executes the step of writing the target data into the storage space corresponding to the LBA of the first logical storage unit, and the steps of generating the second write data request and writing the target data into the storage space corresponding to the LBA of the second logical storage unit). It should be noted that in this embodiment of the present application, the controller can concurrently perform the foregoing multiple steps of writing multiple copies into the storage device (that is, all logical storage units in this embodiment of the present application are equal, without differentiation of a master logical storage unit and a slave logical storage unit. The first logical storage unit, the second logical storage unit, or a third logical storage unit represents a logical storage unit and is not restricted to a specific logical storage unit. In addition, a quantity of first logical storage units, second logical storage units, or third logical storage units is not limited in this embodiment of the present application). It can be learned that in this embodiment of the present application, the controller can quickly write the target data into different logical storage units of the storage device (that is, write multiple copies into the storage device), thereby reducing a system delay and improving an overall access response capability of a system.

In this embodiment of the present application, a first write data request sent by a host is received, where the first write data request includes an ID of a to-be-accessed first logical storage unit, target data, and an LBA of the first logical storage unit. Further, it is determined that data stored in storage space corresponding to the LBA of the first logical storage unit is not accessed by another data access request that has a resource conflict with the first write data request, where the data access request that has a resource conflict with the first write data request refers to a data access request that cannot access storage space corresponding to a same LBA of a same logical storage unit simultaneously with the first write data request. Further, the target data is written into the storage space corresponding to the LBA of the first logical storage unit, a second write data request is generated, where the second write data request includes an ID of a second logical storage unit, the target data, and an LBA of the second logical storage unit, and the target data is written into storage space corresponding to the LBA of the second logical storage unit. It can be learned that the target data can be quickly written into different logical storage units of the storage device, thereby reducing a system delay and improving an overall access response capability of a system.

Optionally, before step S102, the method further includes determining whether the data stored in the storage space corresponding to the LBA of the first logical storage unit is accessed by another data access request that has a resource conflict with the first write data request, and determining that the data stored in the storage space corresponding to the LBA of the first logical storage unit is not accessed by another data access request that has a resource conflict with the first write data request if the data stored in the storage space corresponding to the LBA of the first logical storage unit is not accessed by another data access request that has a resource conflict with the first write data request.

In this embodiment of the present application, before step S102, the method includes determining whether the data stored in the storage space corresponding to the LBA of the first logical storage unit is accessed by another data access request that has a resource conflict with the first write data request. Optionally, whether the data stored in the storage space corresponding to the LBA of the first logical storage unit is accessed by another data access request that has a resource conflict with the first write data request may be determined according to the ID of the first logical storage unit, the LBA of the first logical storage unit, and the mutex logic information that are included in the first write data request. The mutex logic information includes shared mutex logic or exclusive mutex logic. (1) If the data stored in the storage space corresponding to the LBA of the first logical storage unit is definitely not accessed currently by any other data access request, or if the data stored in the storage space corresponding to the LBA of the first logical storage unit is being accessed currently by a data access request (that is, an ID, included in the data access request, of a to-be-accessed logical storage unit is also the ID of the first logical storage unit, and an LBA, included in the data access request, of the logical storage unit is also the LBA of the first logical storage unit), but mutex logic information included in the data access request is shared mutex logic (that is, the data access request can perform an access operation simultaneously with another data access request), the controller may determine that the data stored in the storage space corresponding to the LBA of the first logical storage unit is not accessed by another data access request that has a resource conflict with the first write data request. (2) Alternatively, if the data stored in the storage space corresponding to the LBA of the first logical storage unit is being accessed currently by a data access request (that is, an ID, included in the data access request, of a to-be-accessed logical storage unit is also the ID of the first logical storage unit, and an LBA, included in the data access request, of the logical storage unit is also the LBA of the first logical storage unit), and mutex logic information included in the data access request is exclusive mutex logic (that is, the data access request cannot perform an access operation simultaneously with another data access request) (the exclusive mutex logic means that an event A and an event B do not occur simultaneously in any case), the controller determines that the data stored in the storage space corresponding to the LBA of the first logical storage unit is accessed by another data access request that has a resource conflict with the first write data request, and continues determining whether the data stored in the storage space corresponding to the LBA of the first logical storage unit is accessed by another data access request that has a resource conflict with the first write data request, until the controller determines that the other data access request that has a resource conflict with the first write data request completes access of the data stored in the storage space corresponding to the LBA of the first logical storage unit.

Optionally, writing the target data into storage space corresponding to the LBA of the second logical storage unit includes determining whether data stored in the storage space corresponding to the LBA of the second logical storage unit is accessed by another data access request that has a resource conflict with the second write data request, where the data access request that has a resource conflict with the second write data request refers to a data access request that cannot access storage space corresponding to a same LBA of a same logical storage unit simultaneously with the second write data request, and writing the target data into the storage space corresponding to the LBA of the second logical storage unit if the data stored in the storage space corresponding to the LBA of the second logical storage unit is not accessed by another data access request that has a resource conflict with the second write data request, or comparing whether a priority of the first logical storage unit is higher than a priority of the second logical storage unit if the data stored in the storage space corresponding to the LBA of the second logical storage unit is accessed by another data access request that has a resource conflict with the second write data request, temporarily skipping the step of writing the target data into the storage space corresponding to the LBA of the second logical storage unit if the priority of the first logical storage unit is higher than the priority of the second logical storage unit, and writing the target data into the storage space corresponding to the LBA of the second logical storage unit when the other data access request that has a resource conflict with the second write data request completes access of the data stored in the storage space corresponding to the LBA of the second logical storage unit.

In this embodiment of the present application, step S105 is further as follows. Determine whether the data stored in the storage space corresponding to the LBA of the second logical storage unit is accessed by another data access request that has a resource conflict with the second write data request, where the data access request that has a resource conflict with the second write data request refers to a data access request that cannot access storage space corresponding to a same LBA of a same logical storage unit simultaneously with the second write data request. Optionally, whether the data stored in the storage space corresponding to the LBA of the second logical storage unit is accessed by another data access request that has a resource conflict with the second write data request may be determined according to the ID of the second logical storage unit, the LBA of the second logical storage unit, and the mutex logic information that are included in the second write data request. The mutex logic information includes shared mutex logic or exclusive mutex logic. (1) If the data stored in the storage space corresponding to the LBA of the second logical storage unit is definitely not accessed currently by any other data access request, or if the data stored in the storage space corresponding to the LBA of the second logical storage unit is being accessed currently by a data access request (that is, an ID, included in the data access request, of a to-be-accessed logical storage unit is also the ID of the second logical storage unit, and an LBA, included in the data access request, of the logical storage unit is also the LBA of the second logical storage unit), but mutex logic information included in the data access request is shared mutex logic (that is, the data access request can perform an access operation simultaneously with another data access request), the controller may determine that the data stored in the storage space corresponding to the LBA of the second logical storage unit is not accessed by another data access request that has a resource conflict with the second write data request, and write the target data into the storage space corresponding to the LBA of the second logical storage unit. (2) Alternatively, if the data stored in the storage space corresponding to the LBA of the second logical storage unit is being accessed currently by a data access request (that is, an ID, included in the data access request, of a to-be-accessed logical storage unit is also the ID of the second logical storage unit, and an LBA, included in the data access request, of the logical storage unit is also the LBA of the second logical storage unit), and mutex logic information included in the data access request is exclusive mutex logic (that is, the data access request cannot perform an access operation simultaneously with another data access request), the controller may determine that the data stored in the storage space corresponding to the LBA of the second logical storage unit is accessed by another data access request that has a resource conflict with the second write data request. Then the controller compares whether a priority of the first logical storage unit is higher than a priority of the second logical storage unit. If the priority of the first logical storage unit is higher than the priority of the second logical storage unit, the controller temporarily skips the step of writing the target data into the storage space corresponding to the LBA of the second logical storage unit, and when the other data access request that has a resource conflict with the second write data request completes access of the data stored in the storage space corresponding to the LBA of the second logical storage unit, the controller performs the step of writing the target data into the storage space corresponding to the LBA of the second logical storage unit.

Optionally, if the priority of the first logical storage unit is not higher than the priority of the second logical storage unit, a third write data request is generated, where the third write data request includes an ID of a third logical storage unit, the target data, and an LBA of the third logical storage unit, and a priority of the third logical storage unit is higher than the priority of the first logical storage unit, and the target data is written into storage space corresponding to the LBA of the third logical storage unit.

In this embodiment of the present application, if the priority of the first logical storage unit is not higher than the priority of the second logical storage unit, the third write data request that includes the ID of the third logical storage unit, the target data, and the LBA of the third logical storage unit is generated. The priority of the third logical storage unit is higher than the priority of the first logical storage unit, and the ID of the third logical storage unit is used to indicate a destination logical storage unit of the storage device into which the controller is to write the target data. Optionally, the third logical storage unit may be a LUN, a volume, or the like. Further, the target data is written into the storage space corresponding to the LBA of the third logical storage unit in order to ensure that the target data is written into the storage device in a timely manner. Optionally, a specific step of writing the target data into the storage space corresponding to the LBA of the third logical storage unit is similar to the specific step of writing the target data into the storage space corresponding to the LBA of the second logical storage unit. Reference may be made to the part about writing the target data into the storage space corresponding to the LBA of the second logical storage unit, and details are not repeatedly described herein. It can be learned that in this embodiment of the present application, the target data can be quickly written into different logical storage units of the storage device, thereby reducing a system delay and improving an overall access response capability of a system.

The method further includes receiving a first read data request sent by the host, where the first read data request includes an ID of a to-be-accessed logical storage unit and an LBA of the to-be-accessed logical storage unit, and the to-be-accessed logical storage unit includes the first logical storage unit or the second logical storage unit, determining whether the target data stored in storage space corresponding to the LBA of the to-be-accessed logical storage unit is accessed by another data access request that has a resource conflict with the first read data request, where the data access request that has a resource conflict with the first read data request refers to a data access request that cannot access storage space corresponding to a same LBA of a same logical storage unit simultaneously with the first read data request, and reading the target data stored in the storage space corresponding to the LBA of the to-be-accessed logical storage unit if the target data stored in the storage space corresponding to the LBA of the to-be-accessed logical storage unit is not accessed by another data access request that has a resource conflict with the first read data request, or temporarily skipping the step of reading the target data stored in the storage space corresponding to the LBA of the to-be-accessed logical storage unit if the target data stored in the storage space corresponding to the LBA of the to-be-accessed logical storage unit is accessed by another data access request that has a resource conflict with the first read data request, and reading the target data stored in the storage space corresponding to the LBA of the to-be-accessed logical storage unit when the other data access request that has a resource conflict with the first read data request completes access of the target data stored in the storage space corresponding to the LBA of the to-be-accessed logical storage unit.

In this embodiment of the present application, (1) the controller receives a first read data request that includes an ID of a to-be-accessed logical storage unit and an LBA of the to-be-accessed logical storage unit and that is sent by the host, where the ID of the to-be-accessed logical storage unit is used to indicate a destination logical storage unit of the storage device which the host is to access, of the storage device, the to-be-accessed logical storage unit includes the first logical storage unit or the second logical storage unit, and optionally, the to-be-accessed logical storage unit may be the third logical storage unit, (2) the controller determines whether the target data stored in storage space corresponding to the LBA of the to-be-accessed logical storage unit is accessed by another data access request that has a resource conflict with the first read data request, where the data access request that has a resource conflict with the first read data request refers to a data access request that cannot access storage space corresponding to a same LBA of a same logical storage unit simultaneously with the first read data request, optionally, the controller determines, according to the ID of the to-be-accessed logical storage unit, the LBA of the to-be-accessed logical storage unit, and mutex logic information that are included in the first read data request, whether the target data stored in storage space corresponding to the LBA of the to-be-accessed logical storage unit is accessed by another data access request that has a resource conflict with the first read data request, where the mutex logic information includes shared mutex logic or exclusive mutex logic, a specific determining manner is similar to that in the foregoing step of determining whether the data stored in the storage space corresponding to the LBA of the first logical storage unit is accessed by another data access request that has a resource conflict with the first write data request, and details are not repeatedly described herein, (2a) the controller reads the target data stored in the storage space corresponding to the LBA of the to-be-accessed logical storage unit if the target data stored in the storage space corresponding to the LBA of the to-be-accessed logical storage unit is not accessed by another data access request that has a resource conflict with the first read data request, and (2b) the controller temporarily skips the step of reading the target data stored in the storage space corresponding to the LBA of the to-be-accessed logical storage unit if the target data stored in the storage space corresponding to the LBA of the to-be-accessed logical storage unit is accessed by another data access request that has a resource conflict with the first read data request, and the controller performs the step of reading the target data stored in the storage space corresponding to the LBA of the to-be-accessed logical storage unit when the other data access request that has a resource conflict with the first read data request completes access of the target data stored in the storage space corresponding to the LBA of the to-be-accessed logical storage unit. It can be learned that in this embodiment of the present application, the target data can be quickly read from different logical storage units of the storage device, thereby reducing a system delay and improving an overall access response capability of a system.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. A method for writing multiple copies into a storage device, wherein the storage device comprises a controller and at least two logical storage units, and wherein the method is executed by the controller and comprises:
   receiving a first write data request from a host, wherein the first write data request comprises an identity (ID) of a first logical storage unit, target data, and a logical block address (LBA) of the first logical storage unit;
   determining that data stored in storage space corresponding to the LBA of the first logical storage unit is currently not accessed by a data access request that has a resource conflict with the first write data request, wherein the data access request that has the resource conflict with the first write data request refers to a data access request that cannot access storage space corresponding to a same LBA of a same logical storage unit simultaneously with the first write data request;
   writing the target data into the storage space corresponding to the LBA of the first logical storage unit;
   generating a second write data request, wherein the second write data request comprises an ID of a second logical storage unit, the target data, and an LBA of the second logical storage unit; and
   writing the target data into storage space corresponding to the LBA of the second logical storage unit by:
      determining whether data stored in the storage space corresponding to the LBA of the second logical storage unit is accessed by a data access request that has a resource conflict with the second write data request, wherein the data access request that has a resource conflict with the second write data request refers to a data access request that cannot access storage space corresponding to a same LBA of a same logical storage unit simultaneously with the second write data request;
      writing the target data into the storage space corresponding to the LBA of the second logical storage unit when the data stored in the storage space corresponding to the LBA of the second logical storage unit is not accessed by a data access request that has a resource conflict with the second write data request;
      determining whether a priority of the first logical storage unit is higher than a priority of the second logical storage unit when the data stored in the storage space corresponding to the LBA of the second logical storage unit is accessed by the data access request that has a resource conflict with the second write data request;
      temporarily skipping writing the target data into the storage space corresponding to the LBA of the second logical storage unit when the priority of the first logical storage unit is higher than the priority of the second logical storage unit; and
      writing the target data into the storage space corresponding to the LBA of the second logical storage unit when the data access request that has a resource conflict with the second write data request completes access of the data stored in the storage space corresponding to the LBA of the second logical storage unit.

2. The method of claim 1, further comprising:
   generating a third write data request when the priority of the first logical storage unit is not higher than the priority of the second logical storage unit, wherein the third write data request comprises an ID of a third logical storage unit, the target data, and an LBA of the third logical storage unit, and wherein a priority of the third logical storage unit is higher than the priority of the first logical storage unit; and
   writing the target data into storage space corresponding to the LBA of the third logical storage unit.

3. The method of claim 1, further comprising:
   receiving a first read data request from the host, wherein the first read data request comprises an ID of a to-be-accessed logical storage unit and an LBA of the to-be-accessed logical storage unit, and wherein the to-be-accessed logical storage unit comprises the first logical storage unit or the second logical storage unit;
   determining whether the target data stored in storage space corresponding to the LBA of the to-be-accessed logical storage unit is accessed by a data access request that has a resource conflict with the first read data request, wherein the data access request that has the resource conflict with the first read data request refers to a data access request that cannot access storage space corresponding to a same LBA of a same logical storage unit simultaneously with the first read data request;
   reading the target data stored in the storage space corresponding to the LBA of the to-be-accessed logical storage unit when the target data stored in the storage space corresponding to the LBA of the to-be-accessed logical storage unit is not accessed by the data access request that has a resource conflict with the first read data request;
   temporarily skipping the step of reading the target data stored in the storage space corresponding to the LBA of the to-be-accessed logical storage unit when the target data stored in the storage space corresponding to the LBA of the to-be-accessed logical storage unit is accessed by a data access request that has a resource conflict with the first read data request; and
   reading the target data stored in the storage space corresponding to the LBA of the to-be-accessed logical storage unit when the data access request that has a resource conflict with the first read data request completes access of the target data stored in the storage space corresponding to the LBA of the to-be-accessed logical storage unit.

4. The method of claim 1, wherein the first write data request further comprises mutex logic information.

5. The method of claim 4, wherein the mutex logic information comprises shared mutex logic information.

6. The method of claim 4, wherein the mutex logic information comprises exclusive mutex logic information.

7. The method of claim 4, wherein all of the ID of the first logical storage unit, the target data, the LBA of the first logical storage unit, and the mutex logic information are received together at a same time in the first write data request.

8. A storage device, wherein the storage device comprises a controller and at least two logical storage units, wherein the logical storage units are configured to store data, and wherein the controller is configured to:
receive a first write data request from a host, wherein the first write data request comprises an identity (ID) of a first logical storage unit, target data, and a logical block address (LBA) of the first logical storage unit;
determine that data stored in storage space corresponding to the LBA of the first logical storage unit is currently not accessed by a data access request that has a resource conflict with the first write data request, wherein the data access request that has a resource conflict with the first write data request refers to a data access request that cannot access storage space corresponding to a same LBA of a same logical storage unit simultaneously with the first write data request;
write the target data into the storage space corresponding to the LBA of the first logical storage unit;
generate a second write data request, wherein the second write data request comprises an ID of a second logical storage unit, the target data, and an LBA of the second logical storage unit;
write the target data into storage space corresponding to the LBA of the second logical storage unit;
determine whether data stored in the storage space corresponding to the LBA of the second logical storage unit is accessed by a data access request that has a resource conflict with the second write data request, wherein the data access request that has the resource conflict with the second write data request refers to a data access request that cannot access storage space corresponding to a same LBA of a same logical storage unit simultaneously with the second write data request;
write the target data into the storage space corresponding to the LBA of the second logical storage unit when the data stored in the storage space corresponding to the LBA of the second logical storage unit is not accessed by a data access request that has a resource conflict with the second write data request;
compare whether a priority of the first logical storage unit is higher than a priority of the second logical storage unit when the data stored in the storage space corresponding to the LBA of the second logical storage unit is accessed by a data access request that has a resource conflict with the second write data request;
temporarily skip writing the target data into the storage space corresponding to the LBA of the second logical storage unit when the priority of the first logical storage unit is higher than the priority of the second logical storage unit; and
write the target data into the storage space corresponding to the LBA of the second logical storage unit when the data access request that has the resource conflict with the second write data request completes access of the data stored in the storage space corresponding to the LBA of the second logical storage unit.

9. The storage device of claim 8, wherein the controller is further configured to:
generate a third write data request when the priority of the first logical storage unit is not higher than the priority of the second logical storage unit, wherein the third write data request comprises an ID of a third logical storage unit, the target data, and an LBA of the third logical storage unit, and wherein a priority of the third logical storage unit is higher than the priority of the first logical storage unit; and
write the target data into storage space corresponding to the LBA of the third logical storage unit.

10. The storage device of claim 8, wherein the controller is further configured to:
receive a first read data request from the host, wherein the first read data request comprises an ID of a to-be-accessed logical storage unit and an LBA of the to-be-accessed logical storage unit, and wherein the to-be-accessed logical storage unit comprises the first logical storage unit or the second logical storage unit;
determine whether the target data stored in storage space corresponding to the LBA of the to-be-accessed logical storage unit is accessed by a data access request that has a resource conflict with the first read data request, wherein the data access request that has the resource conflict with the first read data request refers to a data access request that cannot access storage space corresponding to a same LBA of a same logical storage unit simultaneously with the first read data request;
read the target data stored in the storage space corresponding to the LBA of the to-be-accessed logical storage unit when the target data stored in the storage space corresponding to the LBA of the to-be-accessed logical storage unit is not accessed by a data access request that has a resource conflict with the first read data request;
temporarily skip reading the target data stored in the storage space corresponding to the LBA of the to-be-accessed logical storage unit when the target data stored in the storage space corresponding to the LBA of the to-be-accessed logical storage unit is accessed by a data access request that has a resource conflict with the first read data request; and
read the target data stored in the storage space corresponding to the LBA of the to-be-accessed logical storage unit when the data access request that has a resource conflict with the first read data request completes access of the target data stored in the storage space corresponding to the LBA of the to-be-accessed logical storage unit.

11. The storage device of claim 8, wherein the first write data request further comprises mutex logic information.

12. The storage device of claim 11, wherein the mutex logic information comprises shared mutex logic information.

13. The storage device of claim 11, wherein the mutex logic information comprises exclusive mutex logic information.

14. The storage device of claim 11, wherein all of the ID of the first logical storage unit, the target data, the LBA of the first logical storage unit, and the mutex logic information are received together at a same time in the first write data request.

15. A computer program product comprising instructions for storage on a non-transitory computer-readable medium that, when executed by a processor, cause a storage device to:

receive a first write data request from a host, wherein the first write data request comprises an identity (ID) of a first logical storage unit, target data, and a logical block address (LBA) of the first logical storage unit;

determine that data stored in storage space corresponding to the LBA of the first logical storage unit is currently not accessed by a data access request that has a resource conflict with the first write data request, wherein the data access request that has a resource conflict with the first write data request refers to a data access request that cannot access storage space corresponding to a same LBA of a same logical storage unit simultaneously with the first write data request;

write the target data into the storage space corresponding to the LBA of the first logical storage unit;

generate a second write data request, wherein the second write data request comprises an ID of a second logical storage unit, the target data, and an LBA of the second logical storage unit;

write the target data into storage space corresponding to the LBA of the second logical storage unit;

determine whether data stored in the storage space corresponding to the LBA of the second logical storage unit is accessed by a data access request that has a resource conflict with the second write data request, wherein the data access request that has the resource conflict with the second write data request refers to a data access request that cannot access storage space corresponding to a same LBA of a same logical storage unit simultaneously with the second write data request;

write the target data into the storage space corresponding to the LBA of the second logical storage unit when the data stored in the storage space corresponding to the LBA of the second logical storage unit is not accessed by a data access request that has a resource conflict with the second write data request;

compare whether a priority of the first logical storage unit is higher than a priority of the second logical storage unit when the data stored in the storage space corresponding to the LBA of the second logical storage unit is accessed by a data access request that has a resource conflict with the second write data request;

temporarily skip writing the target data into the storage space corresponding to the LBA of the second logical storage unit when the priority of the first logical storage unit is higher than the priority of the second logical storage unit; and write the target data into the storage space corresponding to the LBA of the second logical storage unit when the data access request that has the resource conflict with the second write data request completes access of the data stored in the storage space corresponding to the LBA of the second logical storage unit.

16. The computer program product of claim 15, wherein the instructions further cause the storage device to:

generate a third write data request when the priority of the first logical storage unit is not higher than the priority of the second logical storage unit, wherein the third write data request comprises an ID of a third logical storage unit, the target data, and an LBA of the third logical storage unit, and wherein a priority of the third logical storage unit is higher than the priority of the first logical storage unit; and write the target data into storage space corresponding to the LBA of the third logical storage unit.

17. The computer program product of claim 15, wherein the instructions further cause the storage device to:

receive a first read data request from the host, wherein the first read data request comprises an ID of a to-be-accessed logical storage unit and an LBA of the to-be-accessed logical storage unit, and wherein the to-be-accessed logical storage unit comprises the first logical storage unit or the second logical storage unit;

determine whether the target data stored in storage space corresponding to the LBA of the to-be-accessed logical storage unit is accessed by a data access request that has a resource conflict with the first read data request, wherein the data access request that has the resource conflict with the first read data request refers to a data access request that cannot access storage space corresponding to a same LBA of a same logical storage unit simultaneously with the first read data request;

read the target data stored in the storage space corresponding to the LBA of the to-be-accessed logical storage unit when the target data stored in the storage space corresponding to the LBA of the to-be-accessed logical storage unit is not accessed by a data access request that has a resource conflict with the first read data request;

temporarily skip reading the target data stored in the storage space corresponding to the LBA of the to-be-accessed logical storage unit when the target data stored in the storage space corresponding to the LBA of the to-be-accessed logical storage unit is accessed by a data access request that has a resource conflict with the first read data request; and read the target data stored in the storage space corresponding to the LBA of the to-be-accessed logical storage unit when the data access request that has a resource conflict with the first read data request completes access of the target data stored in the storage space corresponding to the LBA of the to-be-accessed logical storage unit.

18. The computer program product of claim 15, wherein the first write data request further comprises mutex logic information.

19. The computer program product of claim 18, wherein the mutex logic information comprises shared mutex logic information or exclusive mutex logic information.

20. The computer program product of claim 18, wherein all of the ID of the first logical storage unit, the target data, the LBA of the first logical storage unit, and the mutex logic information are received together at a same time in the first write data request.

* * * * *